United States Patent [19]

Sadjina et al.

[11] 4,124,997
[45] Nov. 14, 1978

[54] APPARATUS FOR THE COOLING AND EMBRITTLEMENT OF TIRES

[75] Inventors: Heinz Sadjina; Georg Veranneman, both of Pullach, Germany

[73] Assignee: Linde AG, Wiesbaden, Germany

[21] Appl. No.: 735,005

[22] Filed: Oct. 22, 1976

[30] Foreign Application Priority Data

Oct. 23, 1975 [DE] Fed. Rep. of Germany ....... 2547521

[51] Int. Cl.² ............................................. F25C 5/02
[52] U.S. Cl. .................................... 62/320; 62/374; 62/381; 241/17; 241/23
[58] Field of Search ................ 62/63, 64, 374, 380, 62/381, 266, 320; 241/17, 23; 259/DIG. 24; 134/164

[56] References Cited

U.S. PATENT DOCUMENTS

| 2,847,767 | 8/1958 | Carrier, Jr. | 34/164 |
| 2,983,051 | 5/1961 | Zimmerman et al. | 34/164 |
| 3,187,514 | 6/1965 | Rendos | 62/64 |
| 3,205,543 | 9/1965 | Morris et al. | 62/63 |
| 3,258,852 | 7/1966 | White | 34/164 |
| 3,412,573 | 11/1968 | Pauliukonis | 62/381 |
| 3,866,432 | 2/1975 | Harrison | 62/381 |
| 3,992,899 | 11/1976 | Spahn | 62/381 |

*Primary Examiner*—Ronald C. Capossela
*Attorney, Agent, or Firm*—Karl F. Ross

[57] ABSTRACT

An apparatus for the cooling of objects comprises an upright cylindrical housing having thermally insulated walls and a helical ramp surrounding a column in the housing and along which the objects pass downwardly from an inlet to an outlet. During movement along the ramp, which may be vibrated or oscillated to promote the downward movement of the objects, the latter are chilled to embrittlement temperatures. When the objects are vehicle tires, the pitch of the helical ramp is slightly greater than the diameter of the largest tires to be processed. At the bottom of the ramp the objects may pass into a bath of liquified gas serving as the cooling medium and nozzles can be provided along the lower third of the column for directing jets of the liquefied gas at the objects to be cooled.

5 Claims, 2 Drawing Figures

APPARATUS FOR THE COOLING AND EMBRITTLEMENT OF TIRES

FIELD OF THE INVENTION

The present invention relates to an apparatus for the cooling and especially the deep cooling or chilling of objects so as to embrittle them and facilitate their comminution.

BACKGROUND OF THE INVENTION

It is known that many objects, articles or substances which are relatively pliable, elastic or soft, can be comminuted more effectively in impact-jet or hammer mills as well as in attrition mills such as pin mills, by cooling them to a temperature below their embrittlement point. For example, worn vehicle tires of synthetic and/or natural rubbers cannot be ground in an efficient manner to a granulated or pulverulent mass for subsequent reworking in their normal or soft state.

It has been proposed, therefore, to chill the tires, usually with a liquefied gas (e.g. liquid nitrogen) to embrittle these objects and render them more readily comminutable by attrition or impact mills. Synthetic-resin thermoplastic scraps, e.g. scraps of polyethylene foil, can be recycled in plastic technology in a comminuted state. These scraps are usually too pliable or supple for grinding with conventional apparatus and hence it has been proposed to subject these scraps as well to embrittlement at low and even cryogenic temperatures.

For the most part, such objects are either chilled by permitting them to fall through a cooling tower in counterflow to a rising stream of cooling fluids, by immersing them in a bath of liquefied gas or in some similar manner. In a practical embodiment of these concepts, the chilling apparatus comprises a cooling chamber formed as a tunnel through which the subjects to be chilled are transported on, for example, a conveyor chain, by conveyor baffles, or on conveyor belts. The objects move through the tunnel in counterflow to the cooling fluid which may be in a gaseous state and can leave the tunnel adjacent the object-inlet end. Thus an initial cooling or precooling takes place and the cooling proceeds to lower temperatures as the objects move through the tunnel. A system of this type is described in the German open application (Offenlegungsschrift) DT-OS 22 45 804.

When the objects are large, massive or of complex shape, as is the case with vehicle tires, the cooling tunnel must be very long since the heat transfer coefficient resulting from the gas/solid heat exchange relationship is relatively small, if maximum cold utilization is to be obtained.

Since even with long tunnels it is not always best to completely cool the objects by gas/solid contact, it is a common practice to provide a deep cooling zone in which the transport system carries the objects through a liquefied gas bath. The latter may be provided in a recess or basin at the end of the cooling tunnel and gives a uniform deep cooling of the objects.

The disadvantages of such systems will be immediately apparent. For example, since the transport device must extend through the liquefied gas bath, it must be composed of materials which themselves do not become significantly embrittled at the low temperatures which are employed. Consequently, they are usually constructed from relatively expensive cold-ductile steels. Even when so constructed, they are susceptible to some material fatigue because of the changes in temperature to which they are exposed and breakdown, excessive wear and rupture of the parts of the conveyor are always problems.

Furthermore, the length of the tunnel itself is a significant disadvantage since the transport device must be equally long and hence of complex and expensive construction. Moreover, the ground-space requirement for cooling tunnels renders them uneconomical.

OBJECTS OF THE INVENTION

It is, therefore, the principal object of the invention to provide an apparatus for the chilling of objects to low temperatures sufficient to cause their embrittlement which has low capital and operating costs, provides effective utilization of the cold supplied to the system, occupies less space than prior-art systems and is capable of being operated more conveniently and satisfactorily than earlier systems.

Another object of the invention is to provide an improved apparatus for the chill-embrittlement of objects in a simple and economical manner.

SUMMARY OF THE INVENTION

These objects and others which will become apparent hereinafter are attained, in accordance with the present invention, with a cooling apparatus which comprises a generally cylindrical upright cooling shaft spacedly surrounding a coaxial column and provided with a helical flight or ramp which extends around the column which reaches outwardly toward the inner wall of the shaft. The latter is provided with an opening at the top of the ramp to admit the objects and articles to be chilled and with an outlet at the bottom of the ramp for discharging the embrittled objects. The ramp thus forms a chute along which the objects slide or roll downwardly by gravitational forces under their own weight.

Means is provided in the shaft for subjecting the objects, during their descent, to contact with the chilling or cooling fluid.

Because of the helical arrangement, the chute or ramp over which the objects can be subjected to precooling before they are subjected to deep cooling, e.g. in a bath of liquefied gas or by sprayed jets of liquefied gas, can be relatively long for a relatively short cooling shaft. The apparatus can thus have a limited axial length or height while the path traversed by the objects, passing numerous times around the column while moving downwardly along the ramp, is long. Expensive transport devices are not necessary since the objects can move downwardly predominantly by their own weight, assuming an appropriately steep pitch of the ramp. However, it is possible to promote the downward movement of the objects by vibrating, shaking or oscillating the column on which the ramp is fixed.

According to one embodiment of the invention, the objects at the bottom of the ramp are disposed in a cooling bath of a low-boiling-point liquefied gas, e.g. liquid nitrogen, from which the objects may be removed by a gripper arrangement or crank to be disposed in the comminuting machine. Advantageously, the relatively warm gases recovered from the precooling stretch at the top of the apparatus are passed in heat exchanging relationship with the comminuted objects leaving the mill in a cold condition to recover a part of the cold thereof before being reused in the cooling cycle. Fresh gas is fed into the system to compensate for coolant loss.

According to a further feature of the invention, when the apparatus is to be used for the chilling of vehicle tires, the width of the ramp can be slightly greater than the width of the tire and the pitch thereof slightly greater than the diameter of the tire. In this case, the diameter of the shaft and the pitch angle of the ramp are so selected that the tires roll or slide downwardly by their own weight.

In this embodiment of the invention, moreover, it has been found to be advantageous to eliminate the liquefied-gas cooling bath at the bottom of the cooling shaft, thereby limiting the entrainment of liquid out of the apparatus with the tires and hence loss of the coolant. Since vehicle tires only require cooling to temperatures between −70° C. and −90° C. for embrittlement, such temperatures can be achieved uniformly throughout the tire by providing in the lower third of the cooling shaft, along the ramp and in the wall of the shaft and the column, a nozzle system for spraying jets of the low-boiling liquefied gas onto the side walls of the tires. We have found in practice that the liquefied gas evaporates rapidly upon contact with the walls of the tires and abstracts heat therefrom both by conduction and by the latent heat of vaporization to uniformly chill the tire carcass. Any residual liquid can collect at the bottom of the ramp. The bottom of the ramp may thus be provided with a recess forming a supply vessel for the nozzle system. From the last turn of the ramp, the tires can pass directly onto an inclined plane leading to the comminuting machine.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
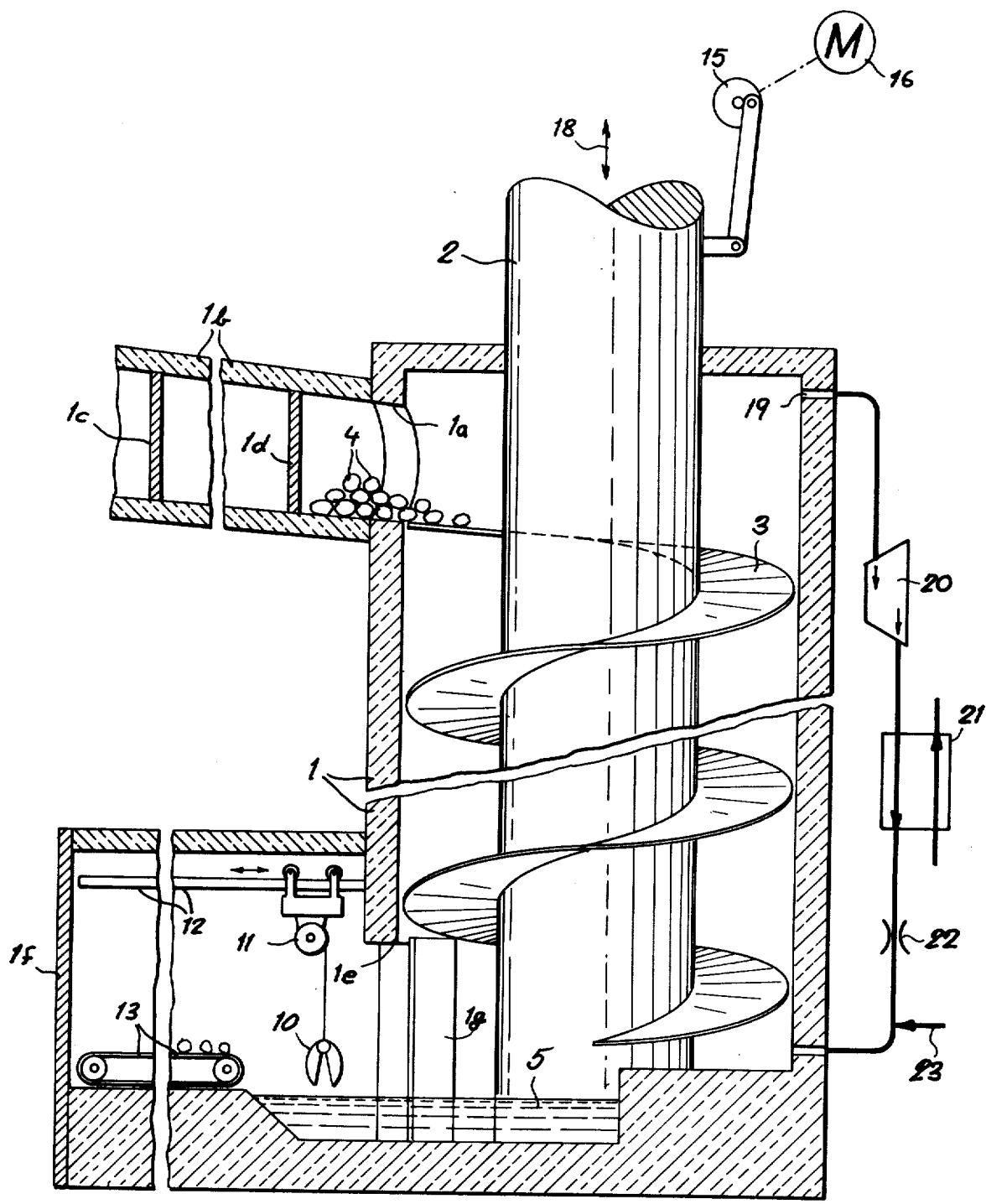
FIG. 1 is a vertical cross-sectional view through a cooling shaft according to one embodiment of the invention.

FIG. 1 shows a thermally insulated cylindrical cooling shaft 1 having a vertical axis along which concentrically extends a column 2. The shaft 1 is provided with an inlet 1a communicating with a duct 1b through which objects 4, e.g. plastic scrap, to be cooled, are introduced preferably through a gate formed by a pair of movable walls 1c and 1d which are shown only diagrammatically in the drawing. These gates form a gas lock limiting the loss of chilling fluid from the system.

The column 2 carries a helical ramp 3 which extends downwardly so that the last turn of the ramp terminates above a bath 5 formed in the shaft and containing a liquefied gas. The outlet opening 1e of the shaft at the bath 2 is provided with movable walls 1f and 1g forming an outlet lock through which the objects pass so that they can be removed by a gripper bucket 10 carried on a windlass 11 which can be shifted horizontally along a track 12. The objects can thus be taken by the bucket out of the bath 5 and disposed upon a conveyor 13 for displacement to a comminuting machine.

The helical ramp 3 spans the gap between the inner wall of the cooling shaft 1 and the exterior of the column 2. Evaporating refrigerant (e.g. a liquefied gas such as nitrogen) rises in the column to cool the objects to their embrittlement temperatures as the objects pass downwardly along the ramp. The latter has a pitch angle such that the objects tend to move downwardly under their own weight by the force of gravity. An eccentric or crank mechanism 15 can be driven by a motor 16 and coupled with the column 2 via a linkage to vibrate the column in the vertical direction as represented by the arrow 18, thereby promoting the downward movement of the objects.

Gas can be drawn from the top of the shaft at an outlet 19 and compressed by a compressor 20. The heat of compression is removed in, for example, a water-cooled heat exchanger 21 or a heat exchanger cooled by another refrigerant. The resulting gas can be expanded through a throttle 22 to the requisite low temperature, the condensate passes into the bath 5 while any remaining cold gas flows upwardly through the shaft.

Figure 2:
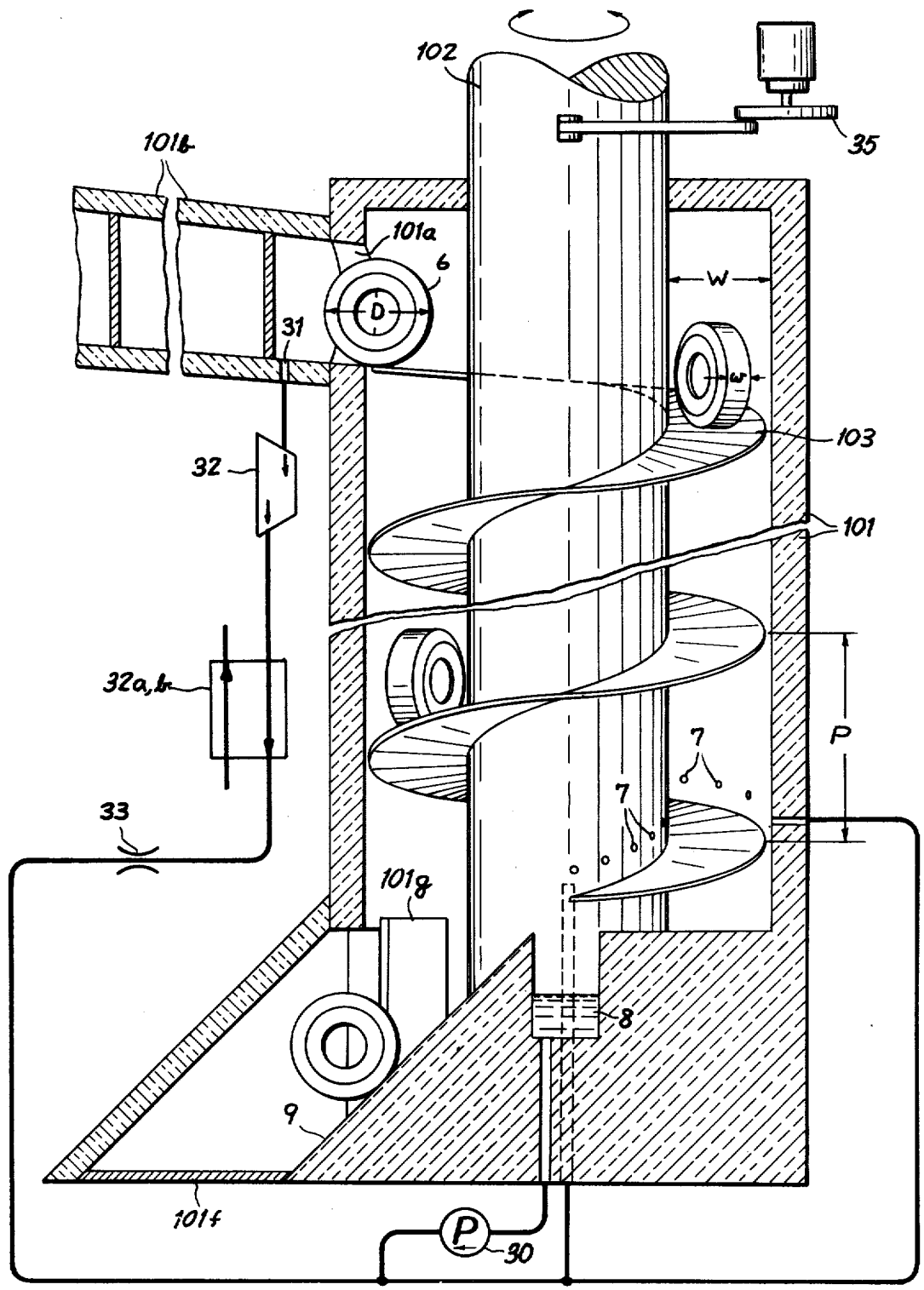
FIG. 2 is a vertical cross-sectional view through a cooling shaft for the chilling of tires.

FIG. 2 shows an embodiment of the invention wherein the shaft 101 is again formed as a cylinder having thermally insulating walls and provided with an inlet 101a with a cold gate or lock 101b. This embodiment is particularly advantageous for use in the chilling of vehicle tires 6 and, to this end, the width W of the helical ramp 103 around the column 102 is slightly greater than the width w of the tires 6. The pitch P of the helix should exceed the diameter D of the tires only slightly. The pitch angle, of course, should be such that the tires tend to roll downwardly of their own weight along the ramp. Preferably the sine of the pitch angle is greater than the quotient of the friction force between the tires and the ramp surface and the weight of the tire. Thus $\sin \alpha > (f/m)$ where $\alpha$ is the pitch angle, $f$ is the friction force retarding downward movement of the tires and $m$ is the weight of the tire. This insures an automatic downward movement of the tires along the ramp. At the bottom of the ramp, the last turn ends above an inclined plane 9 which leads the tires out of the system, advantageously between a pair of movable doors 101g and 101f forming another cold gate.

Along the lower third of the shaft 101 and along the ramp 103, there is provided in the walls of the shaft and the column, a group of nozzles 7 directing jets of liquefied gas against the side walls of the tires 6. The last turn of the ramp can also lie above a well 8 sunk in the shaft 101 to receive excess liquefied gas and serving as a reservoir for the gas fed to the nozzle system.

A pump 30 can be used to circulate the recovered gas from the reservoir 8 to the nozzles 7. At the top of the shaft 101, moreover, the gas can be collected at 31, compressed at 32, cooled by contacting it in a heat exchanger 32a with the comminuted objects leaving a mill in a cold condition to recover cold from said objects or by passing it through a heat exchanger 32b cooled by another refrigerant, and expanded in throttle 33 before being admitted to the shaft through the nozzles 7. In the embodiment of FIGS. 1 and 2, makeup coolant is supplied at 23 and 34 to replace coolant lost by adhesion to the cold objects or through the gates. The column 102 may also be vibrated, here angularly, by a crank drive 35.

We claim:

1. An apparatus for the cooling and comminution of vehicle tires of a size range having a certain largest tire size, comprising:
   an upright cylindrical cooling shaft having an inlet for said tires at an upper end and an outlet for said tires at the lower end;

a column disposed centrally in said shaft and coaxial therewith, said shaft having an inner wall spaced from said column with an all-around clearance;

a helical ramp extending around said column between said column and said inner wall of said shaft from said inlet to said outlet for passing said tires downwardly in successive turns around said column to said outlet, said ramp having a substantially fixed orientation relating to said inlet and outlet, the width of said ramp being slightly greater than the width of the largest of said tires to be embrittled, the pitch of said ramp being at least equal to the diameter of the largest of said tires to be embrittled and the pitch angle of said ramp being such that said tires pass downwardly therealong under their own weight; and means including a nozzle system flanking said ramp over the lower third of the shaft for directing jets of liquefied gas against the side walls of said tires for subjecting said tires on said ramp to contact with a cooling fluid and embrittlement of the tires.

2. The apparatus defined in claim 1 wherein said ramp is fixed to said column, further comprising means for vibrating said column.

3. The apparatus defined in claim 2 wherein said shaft is formed at its bottom adjacent the lowermost turn of said ramp with a cooling bath receiving liquefied gas.

4. The apparatus defined in claim 1, wherein said nozzle system comprises nozzles formed on said wall of said shaft and on said column and disposed at the level of the side walls of tires rolling down said ramp.

5. The apparatus defined in claim 1, further comprising a mill for comminuting the embrittled tires and means for passing a cooling fluid contacted with said tires in said shaft into heat exchanging relationship with the comminuted tires leaving said mill in a cold condition to cool said fluid.

* * * * *